(12) United States Patent
Ikezawa et al.

(10) Patent No.: US 11,667,279 B2
(45) Date of Patent: Jun. 6, 2023

(54) DRIVING ASSISTANCE APPARATUS

(71) Applicant: Toyota Jidosha Kabushiki Kaisha, Toyota (JP)

(72) Inventors: Yuta Ikezawa, Susono (JP); Kohei Tochigi, Shizuoka-ken (JP); Shogo Ito, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 187 days.

(21) Appl. No.: 17/093,845

(22) Filed: Nov. 10, 2020

(65) Prior Publication Data
US 2021/0139020 A1 May 13, 2021

(30) Foreign Application Priority Data
Nov. 13, 2019 (JP) .............. JP2019-205599

(51) Int. Cl.
*B60W 30/09* (2012.01)
*B60W 30/095* (2012.01)
(Continued)

(52) U.S. Cl.
CPC ........ *B60W 30/09* (2013.01); *B60W 30/0956* (2013.01); *B60W 30/16* (2013.01);
(Continued)

(58) Field of Classification Search
CPC ..... B60W 2554/20; B60W 2554/4026; B60W 2554/4029; B60W 2554/802; B60W 2555/60; B60W 2720/106; B60W 30/09; B60W 30/0956; B60W 30/16; B60W 30/162; B60W 30/18109; B60W 50/0098; B60W 50/14; G05D 1/0289
See application file for complete search history.

(56) References Cited

U.S. PATENT DOCUMENTS 10,272,911 B2  4/2019 McNew
10,431,081 B2  10/2019 Kuffner, Jr.
(Continued)

FOREIGN PATENT DOCUMENTS

JP  2019-093882 A  6/2019
JP  2019-171964 A  10/2019

*Primary Examiner* — Peter D Nolan
*Assistant Examiner* — Ce Li Li
(74) *Attorney, Agent, or Firm* — Dinsmore & Shohl LLP

(57) ABSTRACT

A driving assistance apparatus is configured to determine whether a preset deceleration assistance start condition is satisfied, start deceleration assistance for a driver's vehicle against a first deceleration-triggering object, determine whether a preset deceleration assistance termination condition is satisfied, issue a deceleration assistance termination notification to a driver of the driver's vehicle, determine whether a second deceleration-triggering object is detected ahead of the driver's vehicle, and determine whether a preset quick resumption condition is satisfied. The driving assistance apparatus is configured not to issue the deceleration assistance termination notification when the driving assistance apparatus determines that the quick resumption condition is satisfied, even in a case where the driving assistance apparatus determines that the deceleration assistance termination condition for the first deceleration-triggering object is satisfied.

8 Claims, 7 Drawing Sheets

(51) Int. Cl.
  *B60W 30/16* (2020.01)
  *B60W 50/14* (2020.01)
(52) U.S. Cl.
  CPC ......... *B60W 50/14* (2013.01); *B60W 2554/20* (2020.02); *B60W 2554/4026* (2020.02); *B60W 2554/4029* (2020.02); *B60W 2554/802* (2020.02); *B60W 2555/60* (2020.02)

(56) References Cited

U.S. PATENT DOCUMENTS

| | | | |
|---|---|---|---|
| 10,759,477 | B2 | 9/2020 | Ide |
| 10,933,880 | B2 | 3/2021 | Vladimerou |
| 10,960,891 | B2 | 3/2021 | Kindo |
| 10,974,732 | B2 | 4/2021 | Vladimerou |
| 10,992,166 | B2 | 4/2021 | Hsieh |
| 11,008,007 | B2 | 5/2021 | Tochigi |
| 11,029,179 | B2 | 6/2021 | Pinkelman |
| 11,029,697 | B2 | 6/2021 | Cunningham |
| 11,072,342 | B2 | 7/2021 | Kong |
| 11,091,035 | B2 | 8/2021 | Okada |
| 11,104,339 | B2 | 8/2021 | Asano |
| 11,127,293 | B2 | 9/2021 | Takeyama |
| 11,155,262 | B2 | 10/2021 | Avedisov |
| 11,181,383 | B2 | 11/2021 | Amini |
| 11,208,107 | B2 | 12/2021 | Urano |
| 11,216,000 | B2 | 1/2022 | Johnson |
| 11,216,010 | B2 | 1/2022 | Kama |
| 11,220,255 | B2 | 1/2022 | Crawford |
| 11,220,257 | B2 | 1/2022 | Akatsuka |
| 11,225,266 | B2 | 1/2022 | Domeyer |
| 11,231,285 | B2 | 1/2022 | Hokai |
| 11,247,688 | B2 | 2/2022 | Lerner |
| 11,256,462 | B2 | 2/2022 | Yamada |
| 11,270,136 | B2 | 3/2022 | Yanagi |
| 11,279,373 | B2 | 3/2022 | Matsushita |
| 11,285,896 | B2 | 3/2022 | Friedman |
| 11,315,418 | B2 | 4/2022 | Kuffner, Jr. |
| 11,364,929 | B2 | 6/2022 | Zaseck |
| 2005/0216169 | A1* | 9/2005 | Arai ................... B60K 31/0008 180/170 |
| 2009/0128318 | A1* | 5/2009 | Nagata ...................... B60T 7/22 340/467 |
| 2015/0153737 | A1* | 6/2015 | Shiota .................. G05D 1/0289 701/96 |
| 2019/0299990 | A1 | 10/2019 | Tochigi et al. |
| 2020/0239027 | A1* | 7/2020 | Watanabe ............ G05D 1/0088 |

* cited by examiner

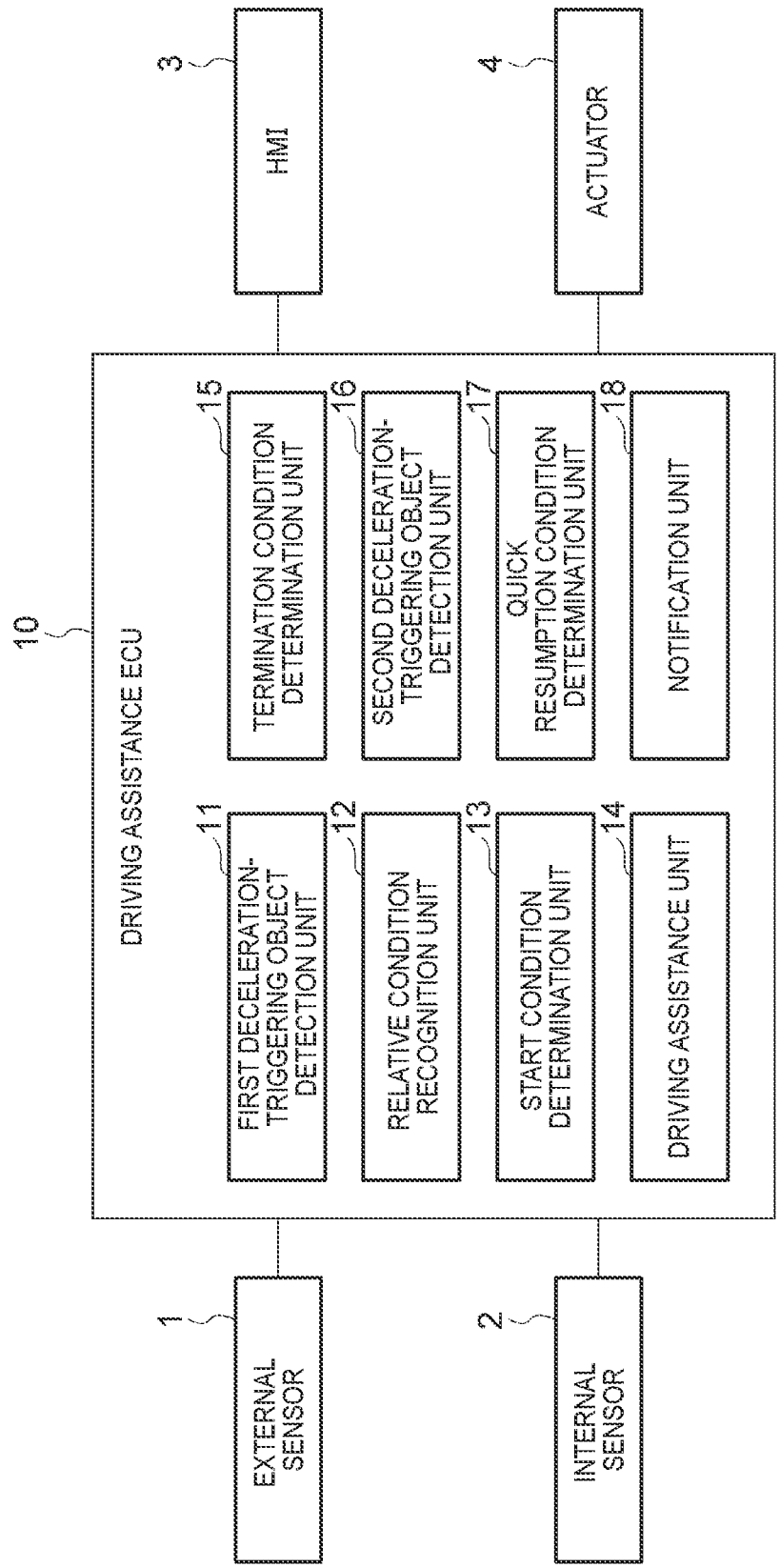

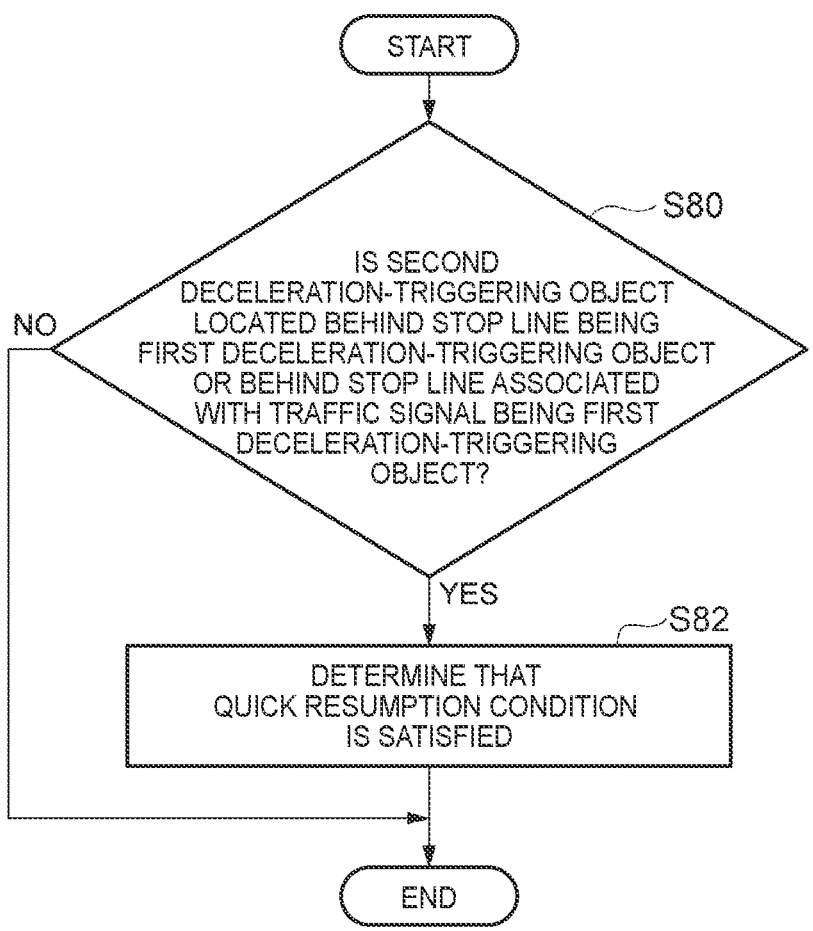

DRIVING ASSISTANCE APPARATUS

CROSS-REFERENCE TO RELATED APPLICATION

This application claims priority to Japanese Patent Application No. 2019-205599 filed on Nov. 13, 2019, which is incorporated herein by reference in its entirety including the specification, drawings and abstract.

BACKGROUND

1. Technical Field

The present disclosure relates to a driving assistance apparatus.

2. Description of Related Art

Japanese Unexamined Patent Application Publication No. 2019-093882 (JP 2019-093882 A) is known as a technical document related to a driving assistance apparatus. JP 2019-093882 A describes a driving assistance apparatus configured such that a driver's vehicle makes transition to a temporary stop mode in which the driver's vehicle stops when the driver's vehicle enters a predetermined area ranging from a temporary stop position. In this driving assistance apparatus, the driver is alerted before termination of the temporary stop mode.

SUMMARY

There is known deceleration assistance for decelerating a driver's vehicle under a predetermined condition to avoid a situation in which the driver's vehicle approaches a deceleration-triggering object such as a preceding vehicle or a stop line at a high speed. In the deceleration assistance, the driver is notified of termination of the deceleration assistance.

Depending on traffic conditions, the termination of deceleration assistance against a first deceleration-triggering object may be followed by the start of deceleration assistance against a second deceleration-triggering object in a short time. In this case, the second deceleration assistance may be started at a timing when the driver notified of the termination of the first deceleration assistance is about to accelerate the driver's vehicle. The notification of the termination of the deceleration assistance may be the cause of driver's discomfort.

A first aspect of the present disclosure relates to a driving assistance apparatus configured to start deceleration assistance for a driver's vehicle based on a distance between the driver's vehicle and a deceleration-triggering object ahead of the driver's vehicle. The driving assistance apparatus includes a start condition determination unit, a driving assistance unit, a termination condition determination unit, a notification unit, a second deceleration-triggering object detection unit, and a quick resumption condition determination unit. The start condition determination unit is configured to determine whether a preset deceleration assistance start condition is satisfied based on a distance between the driver's vehicle and a first deceleration-triggering object ahead of the driver's vehicle. The driving assistance unit is configured to start the deceleration assistance for the driver's vehicle against the first deceleration-triggering object when the start condition determination unit determines that the deceleration assistance start condition is satisfied. The termination condition determination unit is configured to determine whether a preset deceleration assistance termination condition is satisfied based on the distance between the driver's vehicle and the first deceleration-triggering object, or based on a speed of the driver's vehicle during the deceleration assistance for the driver's vehicle against the first deceleration-triggering object. The notification unit is configured to issue a deceleration assistance termination notification to a driver of the driver's vehicle when the termination condition determination unit determines that the deceleration assistance termination condition is satisfied. The second deceleration-triggering object detection unit is configured to determine whether a second deceleration-triggering object is detected ahead of the driver's vehicle during the deceleration assistance for the driver's vehicle against the first deceleration-triggering object. The quick resumption condition determination unit is configured to determine, when the termination condition determination unit determines that the deceleration assistance termination condition for the first deceleration-triggering object is satisfied and the second deceleration-triggering object detection unit determines that the second deceleration-triggering object is detected, whether a preset quick resumption condition is satisfied based on a distance between the driver's vehicle and the second deceleration-triggering object, and based on a relative speed between the driver's vehicle and the second deceleration-triggering object. The notification unit is configured not to issue the deceleration assistance termination notification when the quick resumption condition determination unit determines that the quick resumption condition is satisfied, even in a case where the termination condition determination unit determines that the deceleration assistance termination condition for the first deceleration-triggering object is satisfied.

In the first aspect, the issuance of the deceleration assistance termination notification is not executed when the quick resumption condition determination unit determines that the quick resumption condition is satisfied, even in the case where the termination condition determination unit determines that the deceleration assistance termination condition for the first deceleration-triggering object is satisfied. According to the first aspect, the issuance of the deceleration assistance termination notification can be avoided in a situation in which the termination of the deceleration assistance against the first deceleration-triggering object is followed by the start of the deceleration assistance against the second deceleration-triggering object in a short time. Thus, driver's discomfort due to the deceleration assistance termination notification can be suppressed as compared to a case where the deceleration assistance termination notification is issued without considering the start of the deceleration assistance against the second deceleration-triggering object.

In the first aspect, the quick resumption condition determination unit may be configured to estimate a remaining time until the deceleration assistance start condition for the second deceleration-triggering object is satisfied based on the distance between the driver's vehicle and the second deceleration-triggering object, and based on the relative speed between the driver's vehicle and the second deceleration-triggering object, and determine that the quick resumption condition is satisfied when the remaining time is shorter than a preset time determination threshold.

According to the configuration described above, determination is made that the quick resumption condition is satisfied when the time remaining until the deceleration assistance start condition for the second deceleration-triggering object is satisfied is shorter than the time determination threshold. Therefore, the issuance of the deceleration assistance termination notification can be avoided when the deceleration assistance is resumed in a short time (time shorter than the time determination threshold) after the termination of the deceleration assistance against the first deceleration-triggering object. Thus, the driver's discomfort due to the deceleration assistance termination notification can be suppressed.

In the first aspect, the quick resumption condition determination unit may be configured to estimate a remaining traveling distance until the deceleration assistance start condition for the second deceleration-triggering object is satisfied based on the distance between the driver's vehicle, and based on the second deceleration-triggering object and the relative speed between the driver's vehicle and the second deceleration-triggering object, and determine that the quick resumption condition is satisfied when the remaining traveling distance is shorter than a preset distance determination threshold.

According to the configuration described above, determination is made that the quick resumption condition is satisfied when the traveling distance remaining until the deceleration assistance start condition for the second deceleration-triggering object is satisfied is shorter than the distance determination threshold. Therefore, the issuance of the deceleration assistance termination notification can be avoided when the deceleration assistance is resumed in a short time (time during which the vehicle travels a distance shorter than the distance determination threshold) after the termination of the deceleration assistance against the first deceleration-triggering object. Thus, the driver's discomfort due to the deceleration assistance termination notification can be suppressed.

In the first aspect, the second deceleration-triggering object detection unit may be configured to recognize a type of the detected second deceleration-triggering object. The quick resumption condition determination unit may be configured to use, as the quick resumption condition, a different condition dependent on the type of the second deceleration-triggering object.

According to the configuration described above, the driver may feel discomfort about the deceleration assistance termination notification at different timings depending on the type of the second deceleration-triggering object (for example, a preceding vehicle or a stop line). Therefore, the quick resumption condition is provided depending on the type of the second deceleration-triggering object. Thus, the driver's discomfort due to the deceleration assistance termination notification can be suppressed more appropriately.

In the first aspect, the second deceleration-triggering object detection unit may be configured to recognize a type of the detected second deceleration-triggering object. The quick resumption condition determination unit may be configured to estimate a remaining time until the deceleration assistance start condition for the second deceleration-triggering object is satisfied based on the distance between the driver's vehicle, and based on the second deceleration-triggering object and the relative speed between the driver's vehicle and the second deceleration-triggering object, determine that the quick resumption condition is satisfied when the type of the second deceleration-triggering object is a preceding vehicle and the remaining time is shorter than a preset vehicle time determination threshold, and determine that the quick resumption condition is satisfied when the type of the second deceleration-triggering object is a stationary object and when the remaining time is shorter than a preset stationary-object time determination threshold. The vehicle time determination threshold may be smaller than a time determination threshold for the stationary-object.

According to the configuration described above, when the second deceleration-triggering object is a preceding vehicle that the driver is easily aware of, the driver can predict the next deceleration assistance against the preceding vehicle even if the deceleration assistance termination notification is issued. Therefore, the vehicle time determination threshold is set smaller than the stationary-object time determination threshold. Thus, when there is some time remaining until the deceleration assistance is resumed, the driver can be informed of temporary termination of the deceleration assistance (deceleration assistance against the first deceleration-triggering object) while suppressing driver's excessive discomfort.

In the first aspect, the second deceleration-triggering object detection unit may be configured to recognize a type of the detected second deceleration-triggering object. The quick resumption condition determination unit may be configured to estimate a remaining traveling distance until the deceleration assistance start condition for the second deceleration-triggering object is satisfied based on the distance between the driver's vehicle and the second deceleration-triggering object, and based on the relative speed between the driver's vehicle and the second deceleration-triggering object, determine that the quick resumption condition is satisfied when the type of the second deceleration-triggering object is a preceding vehicle and the remaining traveling distance is shorter than a preset vehicle distance determination threshold, and determine that the quick resumption condition is satisfied when the type of the second deceleration-triggering object is a stationary object and the remaining traveling distance is shorter than a preset stationary-object distance determination threshold. The vehicle distance determination threshold may be smaller than the stationary-object distance determination threshold.

According to the configuration described above, when the second deceleration-triggering object is a preceding vehicle that the driver is easily aware of, the driver can predict the next deceleration assistance against the preceding vehicle even if the deceleration assistance termination notification is issued. Therefore, the vehicle distance determination threshold is set smaller than the stationary-object distance determination threshold. Thus, when there is some time remaining until the deceleration assistance is resumed, the driver can be informed of temporary termination of the deceleration assistance (deceleration assistance against the first deceleration-triggering object) while suppressing driver's excessive discomfort.

A second aspect of the present disclosure relates to a driving assistance apparatus configured to start deceleration assistance for a driver's vehicle based on a distance between the driver's vehicle and a deceleration-triggering object ahead of the driver's vehicle. The driving assistance apparatus includes a start condition determination unit, a driving assistance unit, a termination condition determination unit, a notification unit, a second deceleration-triggering object detection unit, and a quick resumption condition determination unit. The start condition determination unit is configured to determine whether a preset deceleration assistance start condition is satisfied based on a distance between the driver's vehicle and a first deceleration-triggering object. The first deceleration-triggering object is a traffic signal or a stop line ahead of the driver's vehicle. The driving assistance unit is configured to start the deceleration assistance for the driver's vehicle against the first deceleration-triggering object when the start condition determination unit determines that the deceleration assistance start condition is satisfied. The termination condition determination unit is configured to determine whether a preset deceleration assistance termination condition is satisfied based on a vehicle speed of the driver's vehicle during the deceleration assistance for the driver's vehicle against the first deceleration-triggering object. The notification unit is configured to issue a deceleration assistance termination notification to a driver of the driver's vehicle when the termination condition determination unit determines that the deceleration assistance termination condition is satisfied. The second deceleration-triggering object detection unit is configured to determine whether a second deceleration-triggering object is detected during the deceleration assistance for the driver's vehicle against the first deceleration-triggering object. The second deceleration-triggering object is a preceding vehicle traveling ahead of the driver's vehicle. The quick resumption condition determination unit is configured to determine whether a preset quick resumption condition is satisfied when the termination condition determination unit determines that the deceleration assistance termination condition for the first deceleration-triggering object is satisfied and when the second deceleration-triggering object detection unit determines that the second deceleration-triggering object is detected. The quick resumption condition determination unit is configured to determine that the quick resumption condition is satisfied when the second deceleration-triggering object is located behind the stop line being the first deceleration-triggering object or behind a stop line associated with the traffic signal being the first deceleration-triggering object. The notification unit is configured not to issue the deceleration assistance termination notification when the quick resumption condition determination unit determines that the quick resumption condition is satisfied, even in a case where the termination condition determination unit determines that the deceleration assistance termination condition for the first deceleration-triggering object is satisfied.

In the second aspect, the issuance of the deceleration assistance termination notification is not executed when the quick resumption condition determination unit determines that the quick resumption condition is satisfied, even in the case where the termination condition determination unit determines that the deceleration assistance termination condition for the first deceleration-triggering object is satisfied. According to the second aspect, the issuance of the deceleration assistance termination notification can be avoided in the situation in which the termination of the deceleration assistance against the first deceleration-triggering object is followed by the start of the deceleration assistance against the second deceleration-triggering object in a short time. Thus, the driver's discomfort due to the deceleration assistance termination notification can be suppressed as compared to a case where the deceleration assistance termination notification is issued without considering the start of the deceleration assistance against the second deceleration-triggering object.

A third aspect of the present disclosure relates to a driving assistance apparatus configured to start deceleration assistance for a driver's vehicle based on a distance between the driver's vehicle and a deceleration-triggering object ahead of the driver's vehicle. The driving assistance apparatus includes a controller. The controller is configured to determine whether a preset deceleration assistance start condition is satisfied based on a distance between the driver's vehicle, and based on a first deceleration-triggering object ahead of the driver's vehicle, start the deceleration assistance for the driver's vehicle against the first deceleration-triggering object when determining that the deceleration assistance start condition is satisfied, determine whether a preset deceleration assistance termination condition is satisfied based on the distance between the driver's vehicle and the first deceleration-triggering object, or based on a speed of the driver's vehicle during the deceleration assistance for the driver's vehicle against the first deceleration-triggering object, issue a deceleration assistance termination notification to a driver of the driver's vehicle when determining that the deceleration assistance termination condition is satisfied, determine whether a second deceleration-triggering object is detected ahead of the driver's vehicle during the deceleration assistance for the driver's vehicle against the first deceleration-triggering object, and determine, when determining that the deceleration assistance termination condition for the first deceleration-triggering object is satisfied and determining that the second deceleration-triggering object is detected, whether a preset quick resumption condition is satisfied based on a distance between the driver's vehicle and the second deceleration-triggering object, and based on a relative speed between the driver's vehicle and the second deceleration-triggering object. The controller is configured not to issue the deceleration assistance termination notification when the controller determines that the quick resumption condition is satisfied, even in a case where the controller determines that the deceleration assistance termination condition for the first deceleration-triggering object is satisfied.

According to the first aspect, the second aspect, and the third aspect of the present disclosure, the driver's discomfort due to the deceleration assistance termination notification can be suppressed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a block diagram illustrating the configuration of a driving assistance apparatus according to a first embodiment;

FIG. 7 is a flowchart illustrating another example of the quick resumption condition determination process.

DETAILED DESCRIPTION OF EMBODIMENTS

Figure 2A:
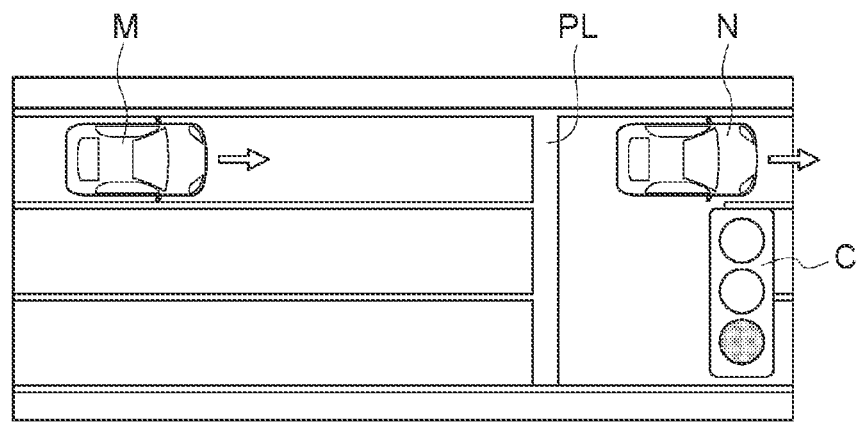
FIG. 2A is a plan illustrating a situation in which a preceding vehicle is traveling over a stop line.

An embodiment of the present disclosure is described below with reference to the drawings.

First Embodiment

A driving assistance apparatus 100 illustrated in FIG. 1 is mounted on a vehicle such as a passenger automobile (driver's vehicle), and assists a driver in driving the driver's vehicle. The driving assistance apparatus 100 performs deceleration assistance for the driver's vehicle under a predetermined condition when a deceleration-triggering object such as a preceding vehicle or a traffic signal is detected ahead of the driver's vehicle. The deceleration-triggering object is an object that triggers the deceleration assistance. The deceleration-triggering object includes a preceding vehicle, a traffic signal, and a stop line. The deceleration-triggering object may include a pedestrian, a bicycle, and other moving objects in addition to the preceding vehicle, and a crosswalk, a fallen object, a construction-related object, a structure, and other stationary objects in addition to the traffic signal and the stop line. The deceleration-triggering object may include only a red or yellow traffic signal, and may exclude a green traffic signal.

The deceleration assistance is driving assistance for decelerating the driver's vehicle to a preset target speed. The target speed is not particularly limited, and may be 0 km/h or 10 km/h. The target speed may be determined depending on the type of the deceleration-triggering object. When the deceleration-triggering object is a traffic signal, the target speed in the deceleration assistance may be changed depending on a lighting color of the traffic signal (lighting color such as green, yellow, or red). The target speed is not limited to a speed of the driver's vehicle, and may be a relative speed between the driver's vehicle and the deceleration-triggering object.

Configuration of Driving Assistance Apparatus of First Embodiment

The configuration of the driving assistance apparatus 100 according to the first embodiment is described with reference to the drawings. As illustrated in FIG. 1, the driving assistance apparatus 100 includes a driving assistance electronic control unit (ECU) 10 configured to manage the overall apparatus. The driving assistance ECU 10 is an electronic control unit including a central processing unit (CPU), a read only memory (ROM), and a random access memory (RAM). For example, the driving assistance ECU 10 implements various functions such that programs stored in the ROM are loaded into the RAM and the CPU executes the programs loaded into the RAM. The driving assistance ECU 10 may be constituted by a plurality of electronic units.

The driving assistance ECU 10 is connected to an external sensor 1, an internal sensor 2, a human machine interface (HMI) 3, and an actuator 4.

The external sensor 1 is a detection device configured to detect conditions around the driver's vehicle. The external sensor 1 includes at least one of a camera and a radar sensor.

The camera is an imaging device configured to image conditions outside the driver's vehicle. For example, the camera is provided on a back side of a windshield of the driver's vehicle to image an area ahead of the driver's vehicle. The camera transmits, to the driving assistance ECU 10, imaging information related to the conditions outside the driver's vehicle. The camera may be a monocular camera or a stereo camera.

The radar sensor is a detection device configured to detect objects around the driver's vehicle by using a radio wave (for example, a millimeter wave) or light. Examples of the radar sensor include a millimeter wave radar and a Light Detection and Ranging (LIDAR) sensor. The radar sensor detects an object by transmitting the radio wave or light to surroundings of the driver's vehicle and receiving the radio wave or light reflected by the object. The radar sensor transmits information on the detected object to the driving assistance ECU 10. The object includes a guardrail, a building, and other stationary obstacles, and a pedestrian, a bicycle, a vehicle other than the driver's vehicle, and other moving obstacles.

The internal sensor 2 is a detection device configured to detect traveling conditions of the driver's vehicle. The internal sensor 2 includes a vehicle speed sensor, an acceleration sensor, and a yaw rate sensor. The vehicle speed sensor is a detection unit configured to detect a speed of the driver's vehicle. Examples of the vehicle speed sensor include a wheel speed sensor provided on each wheel of the driver's vehicle or a drive shaft that rotates together with the wheel, and configured to detect a rotation speed of the wheel. The vehicle speed sensor transmits information on the detected vehicle speed (wheel speed information) to the driving assistance ECU 10.

The acceleration sensor is a detection unit configured to detect an acceleration of the driver's vehicle. Examples of the acceleration sensor include a longitudinal acceleration sensor configured to detect a longitudinal acceleration of the driver's vehicle, and a lateral acceleration sensor configured to detect a lateral acceleration of the driver's vehicle. For example, the acceleration sensor transmits acceleration information of the driver's vehicle to the driving assistance ECU 10. The yaw rate sensor is a detection unit configured to detect a yaw rate (rotational angular velocity) about a vertical axis through the center of gravity of the driver's vehicle. Examples of the yaw rate sensor include a gyroscope. The yaw rate sensor transmits information on the detected yaw rate of the driver's vehicle to the driving assistance ECU 10.

The HMI 3 is an interface for inputting and outputting information between the driving assistance apparatus 100 and the driver. For example, the HMI 3 includes a display and a loudspeaker. The HMI 3 outputs images on the display and voice and sound from the loudspeaker in response to a control signal from the driving assistance ECU 10. The display may be a head-up display (HUD).

The actuator 4 is a device to be used for controlling the driver's vehicle. The actuator 4 includes at least a drive actuator and a brake actuator. The actuator 4 may include a steering actuator. In response to a control signal from the driving assistance ECU 10, the drive actuator controls a driving force of the driver's vehicle by controlling the amount of air to be supplied to an engine (throttle valve opening degree). When the driver's vehicle is a hybrid vehicle, the driving force is controlled by inputting a control signal from the driving assistance ECU 10 to a motor serving as a power source in addition to the amount of air to be supplied to the engine. When the driver's vehicle is an electric vehicle, the driving force is controlled by inputting a control signal from the driving assistance ECU 10 to the motor serving as the power source. In those cases, the motor serving as the power source constitutes the actuator 4.

In response to a control signal from the driving assistance ECU 10, the brake actuator controls a braking force to be applied to each wheel of the driver's vehicle by controlling a brake system. Examples of the brake system include a hydraulic brake system. In response to a control signal from the driving assistance ECU 10, the steering actuator controls driving of an assist motor configured to control a steering torque in an electric power steering system. Thus, the steering actuator controls the steering torque of the driver's vehicle.

Next, the functional configuration of the driving assistance ECU 10 is described. As illustrated in FIG. 1, the driving assistance ECU 10 includes a first deceleration-triggering object detection unit 11, a relative condition recognition unit 12, a start condition determination unit 13, a driving assistance unit 14, a termination condition determination unit 15, a second deceleration-triggering object detection unit 16, a quick resumption condition determination unit 17, and a notification unit 18. A subset of the functions of the driving assistance ECU 10 described below may be executed by a server communicable with the driver's vehicle.

Based on a detection result from the external sensor 1, the first deceleration-triggering object detection unit 11 determines whether a first deceleration-triggering object is detected ahead of the driver's vehicle. The first deceleration-triggering object is detected first in a state in which the deceleration assistance is not executed. The deceleration-triggering object includes a second deceleration-triggering object described later in addition to the first deceleration-triggering object.

The first deceleration-triggering object detection unit 11 recognizes the type of the first deceleration-triggering object (type such as a preceding vehicle, a traffic signal, or a stop line). For example, the first deceleration-triggering object detection unit 11 detects the deceleration-triggering object and recognizes its type through pattern matching using prestored image patterns of individual types based on an image of an area ahead of the driver's vehicle that is captured by the camera. The first deceleration-triggering object detection unit 11 may recognize the type of the deceleration-triggering object based on object information from the radar sensor.

The relative condition recognition unit 12 recognizes a relative condition between the driver's vehicle and the deceleration-triggering object (first deceleration-triggering object or second deceleration-triggering object). The relative condition includes at least a distance between the driver's vehicle and the deceleration-triggering object (distance in the longitudinal direction or the traveling direction of the driver's vehicle). The relative condition may include a relative speed between the driver's vehicle and the deceleration-triggering object.

For example, the relative condition recognition unit 12 recognizes the relative condition between the driver's vehicle and the deceleration-triggering object based on a detection result from the external sensor 1. When the deceleration-triggering object is a vehicle communicable with the driver's vehicle, the relative condition recognition unit 12 may recognize the relative condition between the driver's vehicle and the deceleration-triggering object by using information acquired through the vehicle-to-vehicle communication. For example, the relative condition recognition unit 12 may recognize the relative speed between the driver's vehicle and the deceleration-triggering object based on the speed of the driver's vehicle and a speed of the deceleration-triggering object, which is acquired through the vehicle-to-vehicle communication.

The start condition determination unit 13 determines whether a deceleration assistance start condition for the deceleration-triggering object is satisfied. The deceleration assistance start condition is a preset condition for use in determination as to whether to start the deceleration assistance. The start condition determination unit 13 determines whether the deceleration assistance start condition is satisfied based on at least the distance between the driver's vehicle and the deceleration-triggering object.

The deceleration assistance start condition is changed depending on the type of the deceleration-triggering object. For example, when the type of the deceleration-triggering object is a preceding vehicle, the start condition determination unit 13 determines whether the deceleration assistance start condition for the preceding vehicle is satisfied based on the relative condition between the driver's vehicle and the deceleration-triggering object.

Specifically, the start condition determination unit 13 determines that the deceleration assistance start condition for the preceding vehicle is satisfied when the speed of the driver's vehicle is higher than the speed of the preceding vehicle (the relative speed is a positive value in an approaching direction) and when a time to collision (TTC) between the driver's vehicle and the preceding vehicle is smaller than a TTC threshold. The TTC is obtained by dividing the distance between the driver's vehicle and the deceleration-triggering object (preceding vehicle) by the relative speed between the driver's vehicle and the deceleration-triggering object (approaching speed). The TTC threshold is a preset value. The threshold to be used in the following description means a threshold being a preset value.

The start condition determination unit 13 may determine that the deceleration assistance start condition for the preceding vehicle is satisfied when a time headway (THW) obtained by dividing a distance between the driver's vehicle and the preceding vehicle by the speed of the driver's vehicle is smaller than a THW threshold, instead of using the TTC. The start condition determination unit 13 may determine that the deceleration assistance start condition for the preceding vehicle is satisfied when the distance between the driver's vehicle and the preceding vehicle is shorter than a distance threshold, instead of using the TTC.

The start condition determination unit 13 may determine that the deceleration assistance start condition for the preceding vehicle is satisfied when the speed of the driver's vehicle is higher than the speed of the preceding vehicle and when a required deceleration of the driver's vehicle is equal to or higher than a deceleration threshold. For example, the required deceleration may be a deceleration required to avoid a situation in which the distance between the driver's vehicle and the preceding vehicle is shorter than a threshold determined in advance for each speed. The required deceleration may be a deceleration required to avoid a situation in which the distance between the driver's vehicle and the preceding vehicle is shorter than a fixed value.

When the type of the deceleration-triggering object is a stop line (stationary object), the start condition determination unit 13 determines whether the deceleration assistance start condition for the stop line is satisfied based on the speed of the driver's vehicle that is detected by the internal sensor 2 (vehicle speed sensor) and a relative condition between the driver's vehicle and the stop line.

Specifically, the start condition determination unit 13 may determine that the deceleration assistance start condition for the stop line is satisfied when the speed of the driver's vehicle is equal to or higher than an assistance-start speed threshold and when a TTC between the driver's vehicle and the stop line is smaller than the TTC threshold. In this case, the TTC corresponds to a time required for the driver's vehicle to reach the stop line. The start condition determination unit 13 may determine that the deceleration assistance start condition for the stop line is satisfied when a distance between the driver's vehicle and the stop line is shorter than the distance threshold, instead of using the TTC.

The start condition determination unit 13 may determine that the deceleration assistance start condition for the stop line is satisfied when the speed of the driver's vehicle is equal to or higher than the assistance-start speed threshold and when the required deceleration of the driver's vehicle is equal to or higher than the deceleration threshold. In this case, the required deceleration is a deceleration required to, for example, stop the driver's vehicle at the position of the stop line. The TTC threshold, the distance threshold, and the deceleration threshold may vary depending on the type of the deceleration-triggering object.

When the type of the deceleration-triggering object is a traffic signal, the start condition determination unit 13 makes the determination on the deceleration assistance start condition based on a stop line behind the traffic signal. When the type of the deceleration-triggering object is a traffic signal and when the external sensor 1 fails to detect a stop line behind the traffic signal because the stop line has faded, the start condition determination unit 13 makes the determination on the deceleration assistance start condition under the assumption that the stop line exists at a position that is a predetermined distance behind the traffic signal. The determination on the deceleration assistance start condition for the stop line is applicable to the case where the type of the deceleration-triggering object is a stationary object.

The driving assistance unit 14 starts the deceleration assistance as the driving assistance for the driver's vehicle when the start condition determination unit 13 determines that the deceleration assistance start condition is satisfied. The driving assistance unit 14 performs the deceleration assistance for the driver's vehicle by transmitting a control signal to the actuator 4. For example, the driving assistance unit 14 performs the deceleration assistance to decelerate the driver's vehicle to the preset target speed based on the distance between the driver's vehicle and the deceleration-triggering object and based on the speed of the driver's vehicle.

The driving assistance unit 14 terminates the deceleration assistance when the termination condition determination unit 15 described later determines that a deceleration assistance termination condition is satisfied during execution of the deceleration assistance. Details of the deceleration assistance are not limited to the details described above, and various known deceleration assistance methods may be employed.

The termination condition determination unit 15 determines whether the deceleration assistance termination condition is satisfied during the execution of the deceleration assistance against the deceleration-triggering object. The deceleration assistance termination condition is a preset condition for use in determination as to whether to terminate the deceleration assistance. The termination condition determination unit 15 determines whether the deceleration assistance termination condition is satisfied based on at least the distance between the driver's vehicle and the deceleration-triggering object. The deceleration assistance termination condition is changed depending on the type of the deceleration-triggering object.

Specifically, when the deceleration-triggering object is a preceding vehicle, the termination condition determination unit 15 determines whether the deceleration assistance termination condition is satisfied based on a relative condition between the driver's vehicle and the preceding vehicle. The termination condition determination unit 15 determines that the deceleration assistance termination condition for the preceding vehicle is satisfied when a relative speed between the driver's vehicle and the preceding vehicle is lower than 0 (relative speed at which the driver's vehicle moves away from the preceding vehicle) and when a THW between the driver's vehicle and the preceding vehicle is equal to or higher than a termination THW threshold. The termination condition determination unit 15 may determine that the deceleration assistance termination condition for the preceding vehicle is satisfied when a distance between the driver's vehicle and the preceding vehicle is equal to or longer than a termination distance threshold, instead of using the THW.

The termination condition determination unit 15 may determine whether the deceleration assistance termination condition is satisfied based on the speed of the driver's vehicle. The termination condition determination unit 15 determines that the deceleration assistance termination condition is satisfied when the deceleration-triggering object is a stationary object such as a stop line and when the speed of the driver's vehicle reaches the target speed (target speed in deceleration assistance). The termination condition determination unit 15 may determine that the deceleration assistance termination condition is satisfied when the driver's vehicle is decelerated to a degree equal to or higher than a predetermined value.

The second deceleration-triggering object detection unit 16 determines whether the second deceleration-triggering object is detected during the execution of the deceleration assistance against the first deceleration-triggering object (deceleration-triggering object detected first in the state in which the deceleration assistance is not executed). The second deceleration-triggering object detection unit 16 determines whether the second deceleration-triggering object is detected based on a detection result from the external sensor 1. The second deceleration-triggering object is detected during the execution of the deceleration assistance against the first deceleration-triggering object.

The quick resumption condition determination unit 17 determines whether a quick resumption condition is satisfied when the termination condition determination unit 15 determines that the deceleration assistance termination condition for the first deceleration-triggering object is satisfied and when the second deceleration-triggering object detection unit 16 determines that the second deceleration-triggering object is detected. The quick resumption condition is a preset condition for determination as to whether deceleration assistance against the second deceleration-triggering object is started (resumed) in a short time after the termination of the deceleration assistance against the first deceleration-triggering object. As the quick resumption condition, the quick resumption condition determination unit 17 uses a condition that varies depending on the type of the second deceleration-triggering object.

The quick resumption condition determination unit 17 determines whether the quick resumption condition is satisfied based on a distance between the second deceleration-triggering object and the driver's vehicle and a relative speed between the second deceleration-triggering object and the driver's vehicle. Specifically, the quick resumption condition determination unit 17 determines whether the quick resumption condition is satisfied by using, for example, a time remaining until the deceleration assistance start condition for the second deceleration-triggering object is satisfied (hereinafter referred to as "assistance-resumption remaining time"). The driver's vehicle keeps a current vehicle speed. The quick resumption condition determination unit 17 can estimate the assistance-resumption remaining time based on the distance between the driver's vehicle and the second deceleration-triggering object and the relative speed between the driver's vehicle and the second deceleration-triggering object.

For example, when the type of the second deceleration-triggering object is a preceding vehicle and when the speed of the driver's vehicle is higher than the speed of the preceding vehicle, the quick resumption condition determination unit 17 estimates a time remaining until a TTC between the driver's vehicle and the preceding vehicle is smaller than the TTC threshold as the assistance-resumption remaining time based on a distance between the driver's vehicle and the preceding vehicle and a relative speed between the preceding vehicle and the driver's vehicle. When the type of the second deceleration-triggering object is a stationary object such as a stop line and when the speed of the driver's vehicle is equal to or higher than the assistance-start speed threshold, the quick resumption condition determination unit 17 may estimate a time remaining until a TTC between the driver's vehicle and the stop line is smaller than the TTC threshold as the assistance-resumption remaining time based on a distance between the stop line and the driver's vehicle and based on the speed of the driver's vehicle. The deceleration assistance start condition for use in the estimation of the assistance-resumption remaining time is not limited to the details described above, and various conditions may be employed.

When the assistance-resumption remaining time is shorter than a time determination threshold, the quick resumption condition determination unit 17 determines that the quick resumption condition for the second deceleration-triggering object is satisfied. The time determination threshold may be a fixed value or a threshold that varies depending on the type of the second deceleration-triggering object. For example, the time determination threshold may be a vehicle time determination threshold when the type of the second deceleration-triggering object is a preceding vehicle, and may be a stationary-object time determination threshold when the type of the second deceleration-triggering object is a stationary object. The vehicle time determination threshold is smaller than the stationary-object time determination threshold. When the type of the second deceleration-triggering object is neither a preceding vehicle nor a stationary object (for example, the type is a pedestrian or a bicycle), a general time determination threshold may be used. The general time determination threshold may be equal to the vehicle time determination threshold, or may be smaller than the vehicle time determination threshold.

Specifically, the quick resumption condition determination unit 17 determines that the quick resumption condition for the second deceleration-triggering object is satisfied when the type of the second deceleration-triggering object is a preceding vehicle and when the assistance-resumption remaining time is shorter than the vehicle time determination threshold. The quick resumption condition determination unit 17 does not determine that the quick resumption condition for the second deceleration-triggering object is satisfied when the type of the second deceleration-triggering object is a preceding vehicle and when the assistance-resumption remaining time is equal to or longer than the vehicle time determination threshold. The quick resumption condition determination unit 17 determines that the quick resumption condition for the second deceleration-triggering object is satisfied when the type of the second deceleration-triggering object is a stationary object and when the assistance-resumption remaining time is shorter than the stationary-object time determination threshold. The quick resumption condition determination unit 17 does not determine that the quick resumption condition for the second deceleration-triggering object is satisfied when the type of the second deceleration-triggering object is a stationary object and when the assistance-resumption remaining time is equal to or longer than the stationary-object time determination threshold.

The quick resumption condition determination unit 17 may determine whether the quick resumption condition is satisfied by using a traveling distance remaining until the deceleration assistance start condition for the second deceleration-triggering object is satisfied (hereinafter referred to as "assistance-resumption remaining traveling distance"). The quick resumption condition determination unit 17 can estimate the assistance-resumption remaining traveling distance based on the distance between the second deceleration-triggering object and the driver's vehicle and the relative speed between the second deceleration-triggering object and the driver's vehicle (or the speed of the driver's vehicle).

For example, when the type of the second deceleration-triggering object is a preceding vehicle and when the speed of the driver's vehicle is higher than the speed of the preceding vehicle, the quick resumption condition determination unit 17 estimates a traveling distance remaining until a TTC between the driver's vehicle and the preceding vehicle is smaller than the TTC threshold as the assistance-resumption remaining traveling distance based on a distance between the preceding vehicle and the driver's vehicle and a relative speed between the second deceleration-triggering object and the driver's vehicle. When the type of the second deceleration-triggering object is a stationary object such as a stop line and when the speed of the driver's vehicle is equal to or higher than the assistance-start speed threshold, the quick resumption condition determination unit 17 may estimate a traveling distance remaining until a TTC between the driver's vehicle and the stop line is smaller than the TTC threshold as the assistance-resumption remaining traveling distance based on a distance between the stop line and the driver's vehicle and based on the speed of the driver's vehicle. The deceleration assistance start condition for use in the estimation of the assistance-resumption remaining traveling distance is not limited to the details described above, and various conditions may be employed.

When the assistance-resumption remaining traveling distance is shorter than a traveling distance determination threshold, the quick resumption condition determination unit 17 determines that the quick resumption condition for the second deceleration-triggering object is satisfied. The traveling distance determination threshold may be a fixed value or a threshold that varies depending on the type of the second deceleration-triggering object. For example, the traveling distance determination threshold may be a vehicle traveling distance determination threshold when the type of the second deceleration-triggering object is a preceding vehicle, and may be a stationary-object traveling distance determination threshold when the type of the second deceleration-triggering object is a stationary object. The vehicle traveling distance determination threshold is smaller than the stationary-object traveling distance determination threshold. When the type of the second deceleration-triggering object is neither a preceding vehicle nor a stationary object (for example, the type is a pedestrian or a bicycle), a general traveling distance determination threshold may be used. The general traveling distance determination threshold may be equal to the vehicle traveling distance determination threshold, or may be smaller than the vehicle traveling distance determination threshold.

When the type of the first deceleration-triggering object is a stop line and when the type of the second deceleration-triggering object is a preceding vehicle, the quick resumption condition determination unit 17 may determine whether the quick resumption condition is satisfied based on a distance between the driver's vehicle and the stop line (first deceleration-triggering object) and a distance between the driver's vehicle and the preceding vehicle (second deceleration-triggering object). Specifically, the quick resumption condition determination unit 17 may determine that the quick resumption condition is satisfied when the preceding vehicle being the second deceleration-triggering object is located behind the stop line being the first deceleration-triggering object. The quick resumption condition determination unit 17 may determine that the quick resumption condition is satisfied when the type of the first deceleration-triggering object is a traffic signal, when the type of the second deceleration-triggering object is a preceding vehicle, and when the preceding vehicle being the second deceleration-triggering object is located behind a stop line associated with the traffic signal.

When the type of the first deceleration-triggering object is a traffic signal, when the type of the second deceleration-triggering object is a preceding vehicle, and when the preceding vehicle is decelerating while traveling behind a stop line, the quick resumption condition determination unit 17 may estimate a stop position of the preceding vehicle. The quick resumption condition determination unit 17 may determine that the quick resumption condition is satisfied when the quick resumption condition determination unit 17 estimates that the preceding vehicle being the second deceleration-triggering object stops behind the stop line associated with the traffic signal.

The notification unit 18 notifies the driver of the driver's vehicle about the driving assistance. The notification unit 18 transmits a control signal to the HMI 3 to issue a notification including at least one of image output on the display and audio output from the loudspeaker. When the start condition determination unit 13 determines that the deceleration assistance start condition is satisfied, the notification unit 18 may issue a deceleration assistance start notification. The deceleration assistance start notification is issued to inform the driver of the start of the deceleration assistance. Details of the deceleration assistance start notification are not particularly limited.

When the termination condition determination unit 15 determines that the deceleration assistance termination condition is satisfied, the notification unit 18 issues a deceleration assistance termination notification to the driver of the driver's vehicle. The deceleration assistance termination notification is issued to inform the driver of the termination of the deceleration assistance. Details of the deceleration assistance termination notification are not particularly limited. The deceleration assistance termination notification may be issued by image output, by audio output (including output using only mechanical sound), or by both image output and audio output.

The notification unit 18 avoids issuing the deceleration assistance termination notification when the termination condition determination unit 15 determines that the deceleration assistance termination condition is satisfied but when the quick resumption condition determination unit 17 determines that the quick resumption condition is satisfied. When the deceleration assistance termination notification has already been started, the notification unit 18 may continue the deceleration assistance termination notification.

Next, specific examples of the driving assistance apparatus 100 are described with reference to the drawings. FIG. 2A is a plan illustrating a situation in which a preceding vehicle is traveling over a stop line. FIG. 2A illustrates a driver's vehicle M, a red (stop) traffic signal C, a stop line PL, and a preceding vehicle N. The stop line PL is associated with the traffic signal C.

In the situation illustrated in FIG. 2A, the preceding vehicle N is traveling over the stop line PL. The driving assistance apparatus 100 detects the preceding vehicle N as the second deceleration-triggering object after the deceleration assistance is started by detecting the red traffic signal C as the first deceleration-triggering object. In this case, a distance between the driver's vehicle M and the preceding vehicle N (distance to preceding vehicle) is longer than a distance between the driver's vehicle M and the stop line PL (distance to stop line). Since the quick resumption condition for the preceding vehicle N (second deceleration-triggering object) is not satisfied, the driving assistance apparatus 100 issues the deceleration assistance termination notification to the driver when the deceleration assistance termination condition for the traffic signal C (stop line PL) is satisfied. The deceleration assistance termination notification is not issued when the quick resumption condition is satisfied, for example, because the preceding vehicle N is traveling at a very low speed immediately after passing through the stop line PL.

Figure 2B:
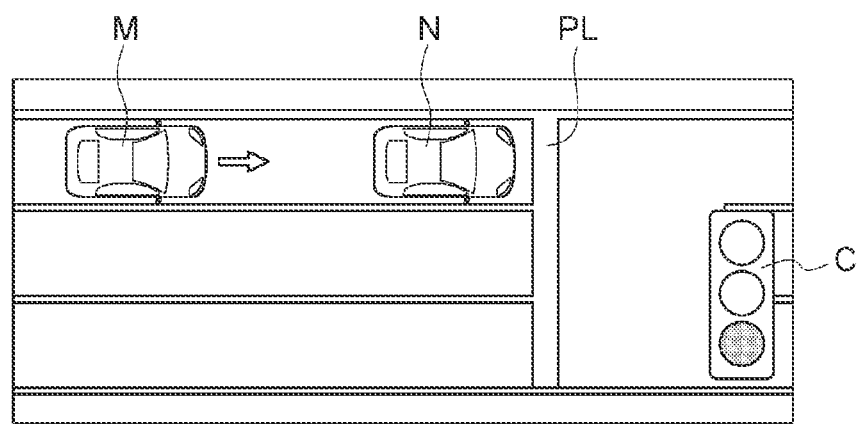
FIG. 2B is a plan illustrating a situation in which the preceding vehicle is stopping behind the stop line.

FIG. 2B is a plan illustrating a situation in which the preceding vehicle N is stopping behind the stop line PL. The driving assistance apparatus 100 detects the preceding vehicle N as the second deceleration-triggering object after the deceleration assistance is started by detecting the red traffic signal C as the first deceleration-triggering object. In the situation illustrated in FIG. 2B, a relationship of "distance to preceding vehicle<distance to stop line" holds, and the preceding vehicle N is stopping. In this case, the quick resumption condition determination unit 17 determines that the quick resumption condition is satisfied because the preceding vehicle N being the second deceleration-triggering object is located behind the stop line PL associated with the traffic signal C being the first deceleration-triggering object.

Even if the deceleration assistance termination condition for the traffic signal C being the first deceleration-triggering object is satisfied, the driving assistance apparatus 100 can avoid issuing the deceleration assistance termination notification in a state in which the stopping preceding vehicle N (second deceleration-triggering object) is present at a short distance and the driver is easily aware of the preceding vehicle N. When the stop line PL cannot be detected, the driving assistance apparatus 100 may recognize a distance to an assumed stop line under the assumption that the stop line PL exists at a position that is a predetermined distance behind the traffic signal C.

Figure 2C:
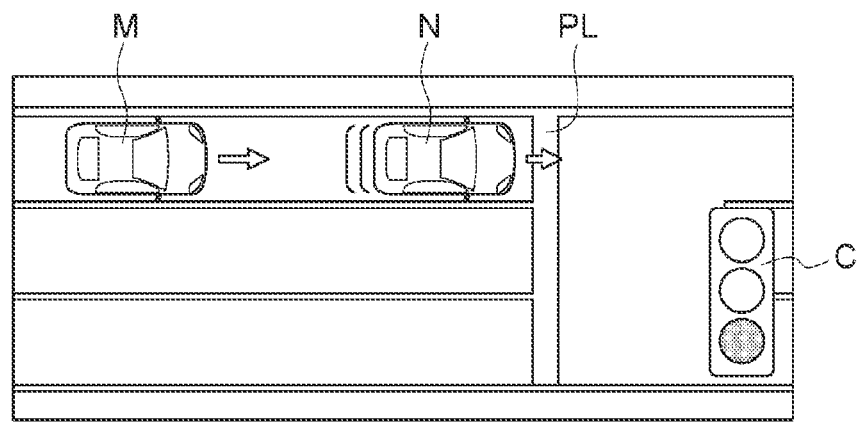
FIG. 2C is a plan illustrating a situation in which the preceding vehicle is traveling behind the stop line.

FIG. 2C is a plan illustrating a situation in which the preceding vehicle N is traveling (decelerating) behind the stop line PL. In the situation illustrated in FIG. 2C, a relationship of "distance to preceding vehicle<distance to stop line" holds, and the preceding vehicle N is decelerating. In this case, the quick resumption condition determination unit 17 estimates a stop position of the preceding vehicle N based on the distance to the preceding vehicle and a speed or deceleration of the preceding vehicle N. The quick resumption condition determination unit 17 determines that the quick resumption condition is satisfied when the quick resumption condition determination unit 17 estimates that the preceding vehicle being the second deceleration-triggering object stops behind the stop line associated with the traffic signal. Even if the deceleration assistance termination condition for the traffic signal C being the first deceleration-triggering object is satisfied, the driving assistance apparatus 100 can avoid issuing the deceleration assistance termination notification in a state in which the preceding vehicle N (second deceleration-triggering object) is traveling ahead of the driver's vehicle M and the driver is easily aware of the preceding vehicle N.

Figure 3A:
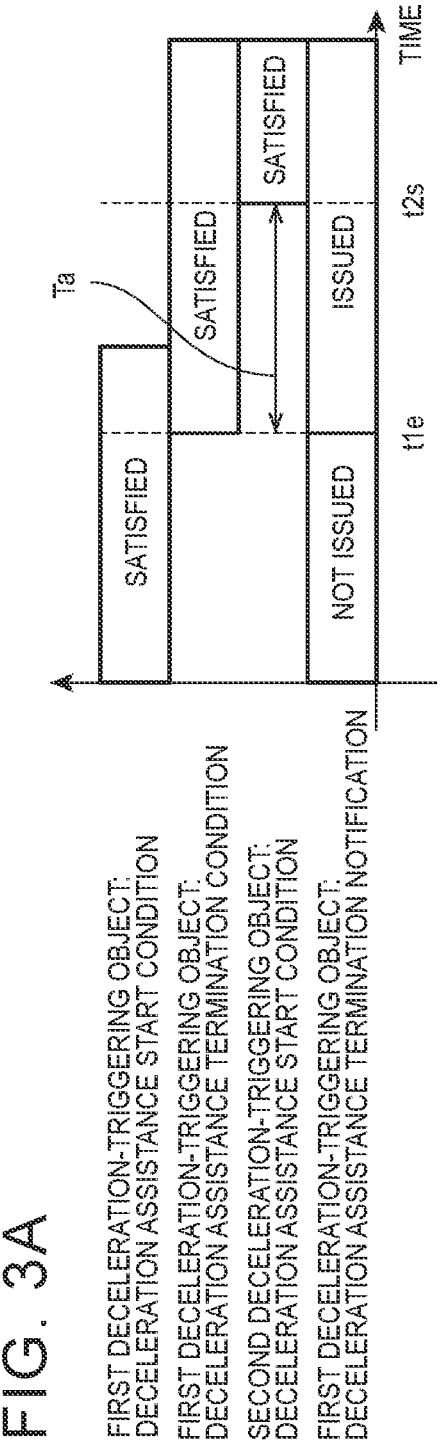
FIG. 3A is a diagram for describing a situation in which a long time remains from satisfaction of a deceleration assistance termination condition for a first deceleration-triggering object to satisfaction of a deceleration assistance start condition for a second deceleration-triggering object.

FIG. 3A is a diagram for describing a situation in which a long time remains from the satisfaction of the deceleration assistance termination condition for the first deceleration-triggering object to the satisfaction of the deceleration assistance start condition for the second deceleration-triggering object. FIG. 3A illustrates a first deceleration assistance termination timing t1e when the deceleration assistance termination condition for the first deceleration-triggering object is satisfied, a second deceleration assistance start timing t2s when the deceleration assistance start condition for the second deceleration-triggering object is satisfied, and an assistance resumption time Ta between the first deceleration assistance termination timing t1e and the second deceleration assistance start timing t2s.

In the situation illustrated in FIG. 3A, the assistance resumption time Ta is long, and the quick resumption condition for the second deceleration assistance is not satisfied at the first deceleration assistance termination timing t1e. Therefore, the deceleration assistance termination notification is issued to inform the driver of the termination of the deceleration assistance against the first deceleration-triggering object. In this case, the notification unit 18 issues the deceleration assistance termination notification from the first deceleration assistance termination timing t1e. The deceleration assistance termination notification may be terminated before the second deceleration assistance start timing t2s.

Figure 3B:
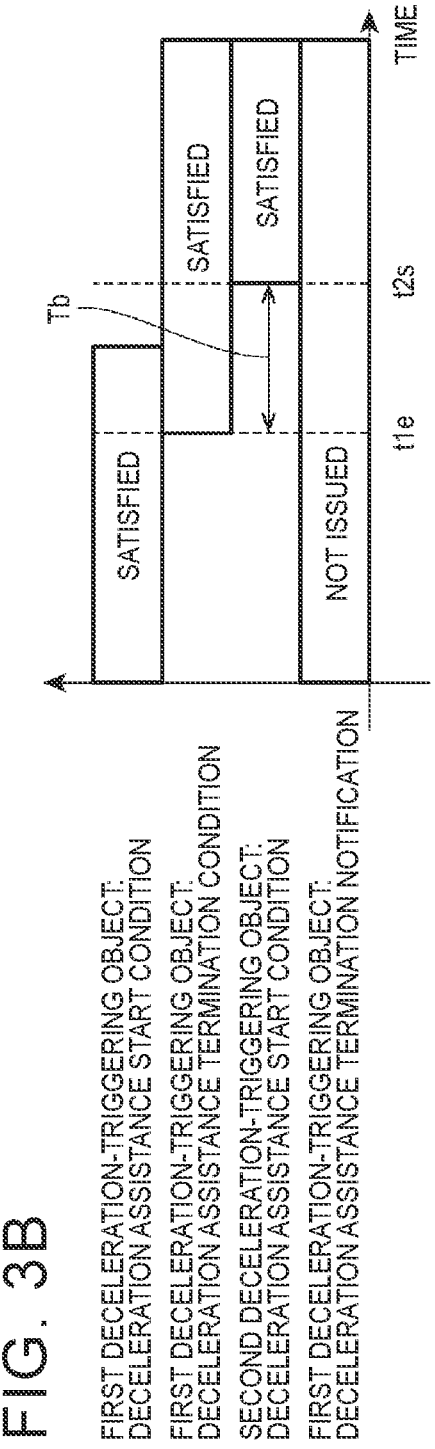
FIG. 3B is a diagram for describing a situation in which a short time remains from the satisfaction of the deceleration assistance termination condition for the first deceleration-triggering object to the satisfaction of the deceleration assistance start condition for the second deceleration-triggering object.

FIG. 3B is a diagram for describing a situation in which a short time remains from the satisfaction of the deceleration assistance termination condition for the first deceleration-triggering object to the satisfaction of the deceleration assistance start condition for the second deceleration-triggering object. FIG. 3B illustrates an assistance resumption time Tb between the first deceleration assistance termination timing t1e and the second deceleration assistance start timing t2s. The assistance resumption time Tb is shorter than the assistance resumption time Ta in FIG. 3A.

In the situation illustrated in FIG. 3B, the assistance resumption time Tb is short, and the quick resumption condition for the second deceleration assistance is satisfied at the first deceleration assistance termination timing t1e. Therefore, the deceleration assistance termination notification in the first deceleration-triggering object is not issued. Thus, the driving assistance apparatus 100 can suppress driver's discomfort due to the deceleration assistance termination notification issued when the termination of the deceleration assistance against the first deceleration-triggering object is followed by the resumption of the deceleration assistance against the second deceleration-triggering object in a short time.

Processes in Driving Assistance Apparatus of First Embodiment

Figure 4A:
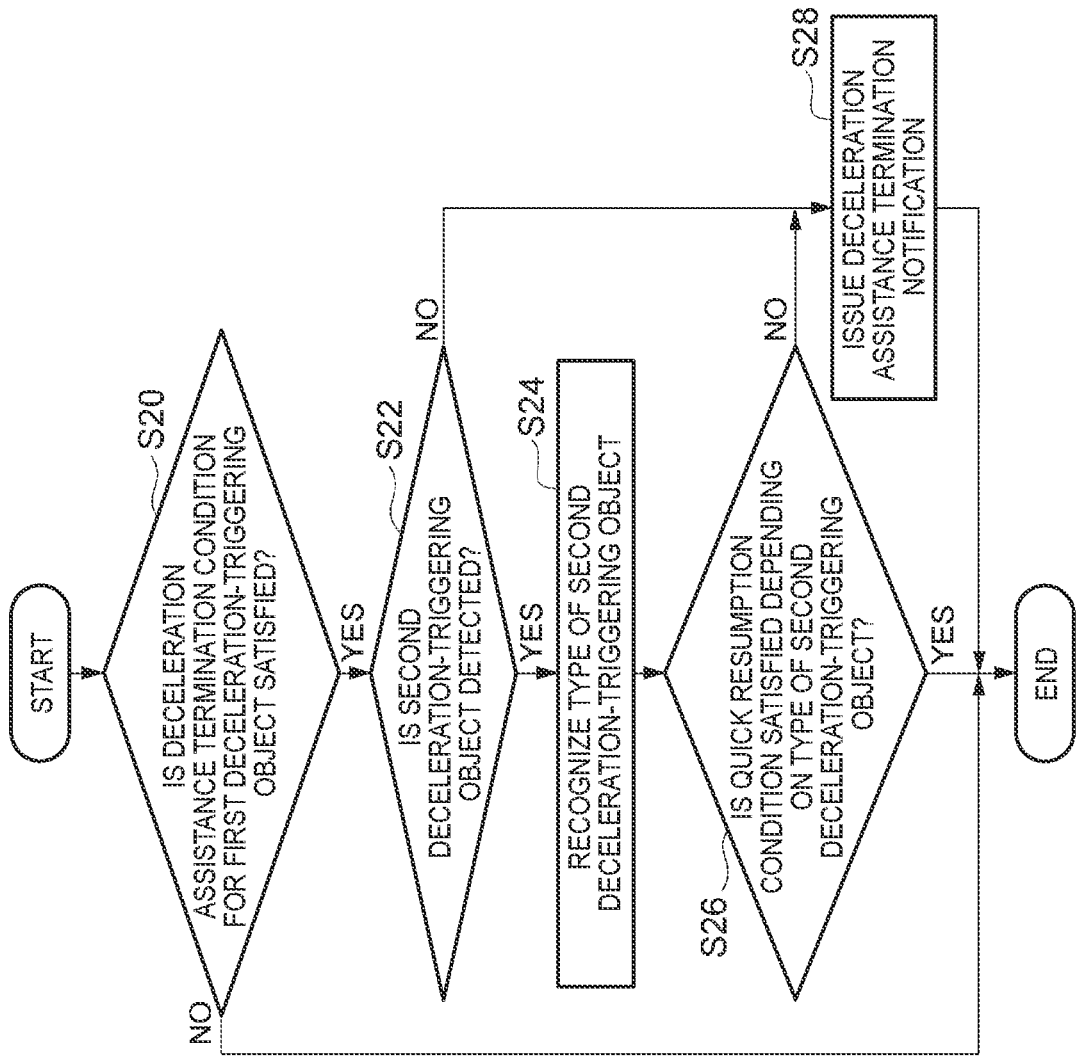
FIG. 4A is a flowchart illustrating an example of a deceleration start process in the first deceleration-triggering object.

Next, processes in the driving assistance apparatus 100 of the first embodiment are described with reference to the drawings. FIG. 4A is a flowchart illustrating an example of a deceleration start process in the first deceleration-triggering object. The deceleration start process is performed during execution of the driving assistance function.

As illustrated in FIG. 4A, the driving assistance ECU 10 of the driving assistance apparatus 100 determines, in S10, whether the first deceleration-triggering object detection unit 11 detects the first deceleration-triggering object. The first deceleration-triggering object detection unit 11 detects the first deceleration-triggering object ahead of the driver's vehicle based on a detection result from the external sensor 1. When the driving assistance ECU 10 determines that the first deceleration-triggering object is detected (S10: YES), the driving assistance ECU 10 proceeds to S12. When the driving assistance ECU 10 does not determine that the first deceleration-triggering object is detected (S10: NO), the driving assistance ECU 10 terminates the current process. After an elapse of a predetermined time, the driving assistance ECU 10 repeats the process from S10.

In S12, the driving assistance ECU 10 causes the first deceleration-triggering object detection unit 11 to recognize the type of the first deceleration-triggering object. For example, the first deceleration-triggering object detection unit 11 recognizes the type of the deceleration-triggering object through pattern matching using prestored image patterns of individual types based on an image of an area ahead of the driver's vehicle that is captured by the camera. The relative condition recognition unit 12 recognizes a relative condition between the driver's vehicle and the deceleration-triggering object (first deceleration-triggering object or second deceleration-triggering object).

In S14, the driving assistance ECU 10 causes the start condition determination unit 13 to determine whether the deceleration assistance start condition for the first deceleration-triggering object is satisfied. For example, when the type of the deceleration-triggering object is a preceding vehicle, the start condition determination unit 13 determines whether the deceleration assistance start condition for the preceding vehicle is satisfied based on the relative condition between the driver's vehicle and the deceleration-triggering object. When determination is made that the deceleration assistance start condition is satisfied (S14: YES), the driving assistance ECU 10 proceeds to S16. When determination is not made that the deceleration assistance start condition is satisfied (S14: NO), the driving assistance ECU 10 terminates the current process. After an elapse of a predetermined time, the driving assistance ECU 10 repeats the process from S10.

In S16, the driving assistance ECU 10 causes the driving assistance unit 14 to execute the deceleration assistance against the first deceleration-triggering object. The driving assistance unit 14 performs the deceleration assistance for the driver's vehicle by transmitting a control signal to the actuator 4.

Figure 4B:
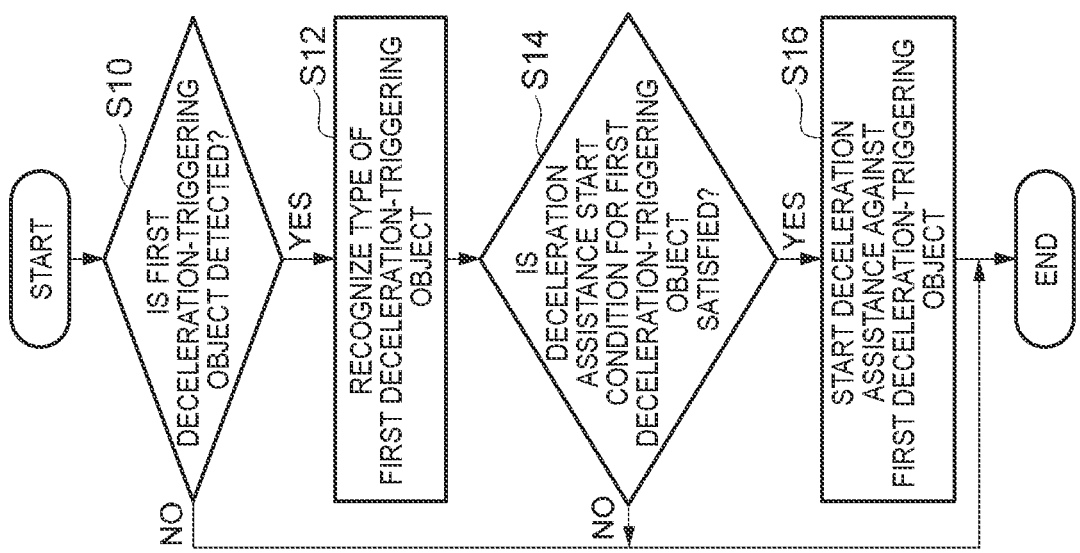
FIG. 4B is a flowchart illustrating an example of a deceleration assistance termination process.

FIG. 4B is a flowchart illustrating an example of a deceleration assistance termination process. The deceleration assistance termination process is performed during the execution of the deceleration assistance against the first deceleration-triggering object.

As illustrated in FIG. 4B, the driving assistance ECU 10 causes, in S20, the termination condition determination unit 15 to determine whether the deceleration assistance termination condition for the first deceleration-triggering object is satisfied. For example, when the deceleration-triggering object is a preceding vehicle, the termination condition determination unit 15 determines whether the deceleration assistance termination condition is satisfied based on a relative condition between the driver's vehicle and the preceding vehicle. When determination is made that the deceleration assistance termination condition for the first deceleration-triggering object is satisfied (S20: YES), the driving assistance ECU 10 proceeds to S22. When determination is not made that the deceleration assistance termination condition for the first deceleration-triggering object is satisfied (S20: NO), the driving assistance ECU 10 terminates the current process. After an elapse of a predetermined time, the driving assistance ECU 10 repeats the process from S20.

In S22, the driving assistance ECU 10 determines whether the second deceleration-triggering object detection unit 16 detects the second deceleration-triggering object. The second deceleration-triggering object detection unit 16 determines whether the second deceleration-triggering object is detected based on a detection result from the external sensor 1. When the driving assistance ECU 10 determines that the second deceleration-triggering object is detected (S22: YES), the driving assistance ECU 10 proceeds to S24. When the driving assistance ECU 10 does not determine that the second deceleration-triggering object is detected (S22: NO), the driving assistance ECU 10 proceeds to S28.

In S24, the driving assistance ECU 10 causes the second deceleration-triggering object detection unit 16 to recognize the type of the second deceleration-triggering object. For example, the second deceleration-triggering object detection unit 16 recognizes the type of the second deceleration-triggering object similarly to the first deceleration-triggering object detection unit 11.

In S26, the driving assistance ECU 10 causes the quick resumption condition determination unit 17 to determine whether the quick resumption condition is satisfied depending on the type of the second deceleration-triggering object. For example, the quick resumption condition determination unit 17 determines whether the quick resumption condition is satisfied by using a time or traveling distance remaining until the deceleration assistance start condition for the second deceleration-triggering object is satisfied. When determination is made that the quick resumption condition is satisfied (S26: YES), the driving assistance ECU 10 terminates the current process. In this case, the driving assistance ECU 10 avoids issuing the deceleration assistance termination notification about the first deceleration-triggering object. When determination is not made that the quick resumption condition is satisfied (S26: NO), the driving assistance ECU 10 proceeds to S28.

In S28, the driving assistance ECU 10 causes the notification unit 18 to issue the deceleration assistance termination notification. The notification unit 18 transmits a control signal to the HMI 3 to issue the deceleration assistance termination notification by at least one of image output on the display and audio output from the loudspeaker.

Next, description is given of a specific example of the determination on the quick resumption condition by the quick resumption condition determination unit 17 (S26). First, description is given of the setting of the time determination threshold for use in the determination on the quick resumption condition using a remaining time.

Figure 5B:
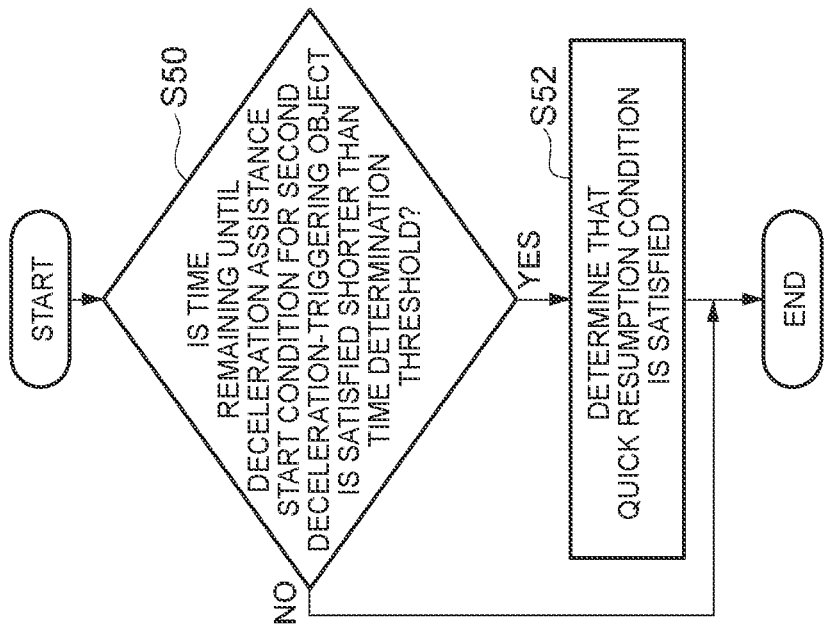
FIG. 5B is a flowchart illustrating an example of a quick resumption condition determination process using a remaining time.
Figure 5A:
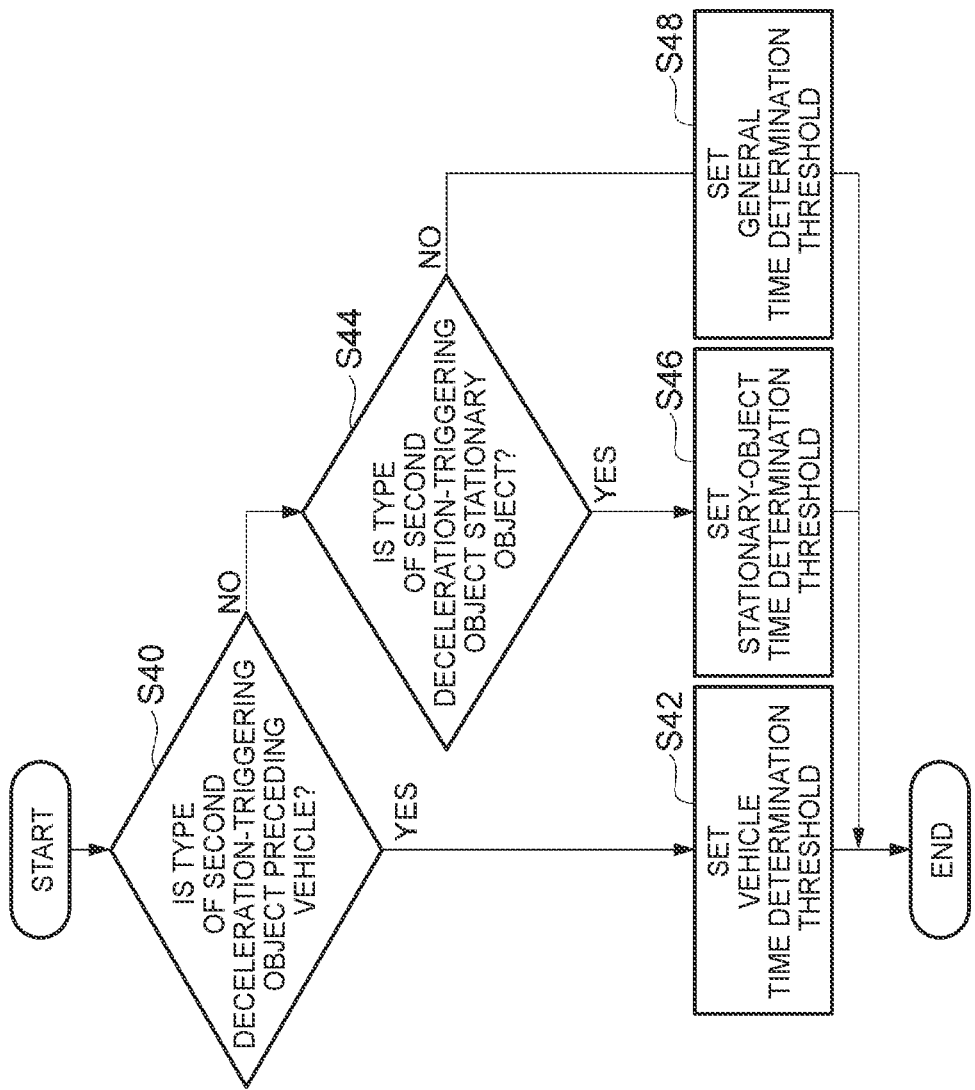
FIG. 5A is a flowchart illustrating an example of a time determination threshold setting process.

FIG. 5A is a flowchart illustrating an example of a time determination threshold setting process. As illustrated in FIG. 5A, the driving assistance ECU 10 causes, in S40, the second deceleration-triggering object detection unit 16 to determine whether the type of the second deceleration-triggering object is a preceding vehicle. When determination is made that the type of the second deceleration-triggering object is a preceding vehicle (S40: YES), the driving assistance ECU 10 proceeds to S42. When determination is not made that the type of the second deceleration-triggering object is a preceding vehicle (S40: NO), the driving assistance ECU 10 proceeds to S44.

In S42, the driving assistance ECU 10 causes the quick resumption condition determination unit 17 to set the vehicle time determination threshold as the time determination threshold for use in the quick resumption condition.

In S44, the driving assistance ECU 10 causes the second deceleration-triggering object detection unit 16 to determine whether the type of the second deceleration-triggering object is a stationary object. When determination is made that the type of the second deceleration-triggering object is a stationary object (S44: YES), the driving assistance ECU 10 proceeds to S46. When determination is not made that the type of the second deceleration-triggering object is a stationary object (S44: NO), the driving assistance ECU 10 proceeds to S48.

In S46, the driving assistance ECU 10 causes the quick resumption condition determination unit 17 to set the stationary-object time determination threshold as the time determination threshold for use in the quick resumption condition. In S48, the driving assistance ECU 10 causes the quick resumption condition determination unit 17 to set the general time determination threshold as the time determination threshold for use in the quick resumption condition.

FIG. 5B is a flowchart illustrating an example of a quick resumption condition determination process using a remaining time. As illustrated in FIG. 5B, the driving assistance ECU 10 causes, in S50, the quick resumption condition determination unit 17 to determine whether a time remaining until the deceleration assistance start condition for the second deceleration-triggering object is satisfied (assistance-resumption remaining time) is shorter than the time determination threshold (time determination threshold set through the time determination threshold setting process).

When determination is made that the assistance-resumption remaining time is shorter than the time determination threshold (S50: YES), the driving assistance ECU 10 proceeds to S52. When determination is not made that the assistance-resumption remaining time is shorter than the time determination threshold (S50: NO), the driving assistance ECU 10 terminates the current process.

In S52, the driving assistance ECU 10 causes the quick resumption condition determination unit 17 to determine that the quick resumption condition is satisfied.

Next, description is given of the setting of the distance determination threshold for use in the determination on the quick resumption condition using a remaining traveling distance. FIG. 6A is a flowchart illustrating an example of a distance determination threshold setting process.

As illustrated in FIG. 6A, the driving assistance ECU 10 causes, in S60, the second deceleration-triggering object detection unit 16 to determine whether the type of the second deceleration-triggering object is a preceding vehicle. When determination is made that the type of the second deceleration-triggering object is a preceding vehicle (S60: YES), the driving assistance ECU 10 proceeds to S62. When determination is not made that the type of the second deceleration-triggering object is a preceding vehicle (S60: NO), the driving assistance ECU 10 proceeds to S64.

In S62, the driving assistance ECU 10 causes the quick resumption condition determination unit 17 to set the vehicle distance determination threshold as the distance determination threshold for use in the quick resumption condition.

In S64, the driving assistance ECU 10 causes the second deceleration-triggering object detection unit 16 to determine whether the type of the second deceleration-triggering object is a stationary object. When determination is made that the type of the second deceleration-triggering object is a stationary object (S64: YES), the driving assistance ECU 10 proceeds to S66. When determination is not made that the type of the second deceleration-triggering object is a stationary object (S64: NO), the driving assistance ECU 10 proceeds to S68.

In S66, the driving assistance ECU 10 causes the quick resumption condition determination unit 17 to set the stationary-object distance determination threshold as the distance determination threshold for use in the quick resumption condition. In S68, the driving assistance ECU 10 causes the quick resumption condition determination unit 17 to set the general distance determination threshold as the distance determination threshold for use in the quick resumption condition.

Figure 6B:
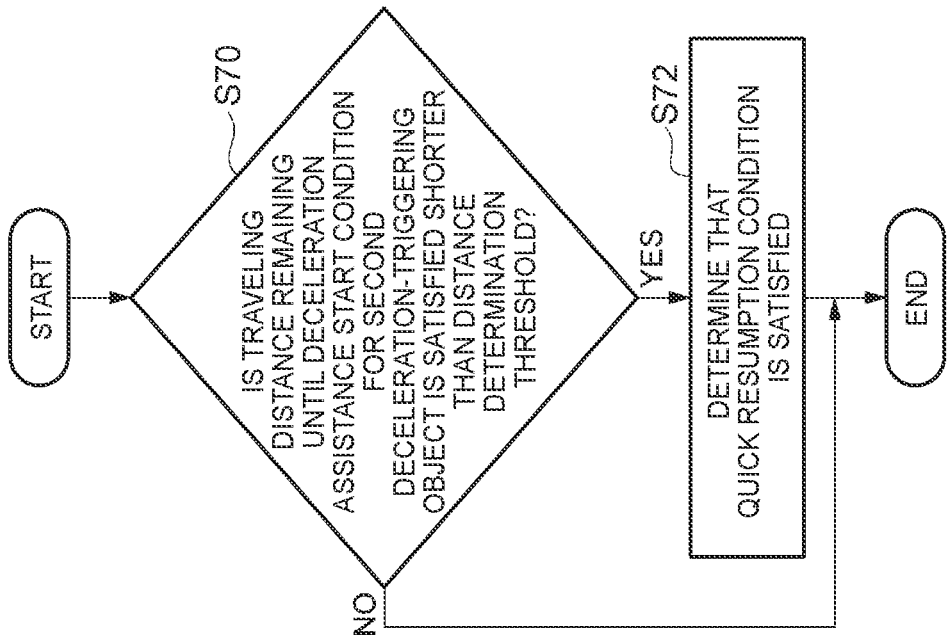
FIG. 6B is a flowchart illustrating an example of a quick resumption condition determination process using a remaining traveling distance.
Figure 6A:
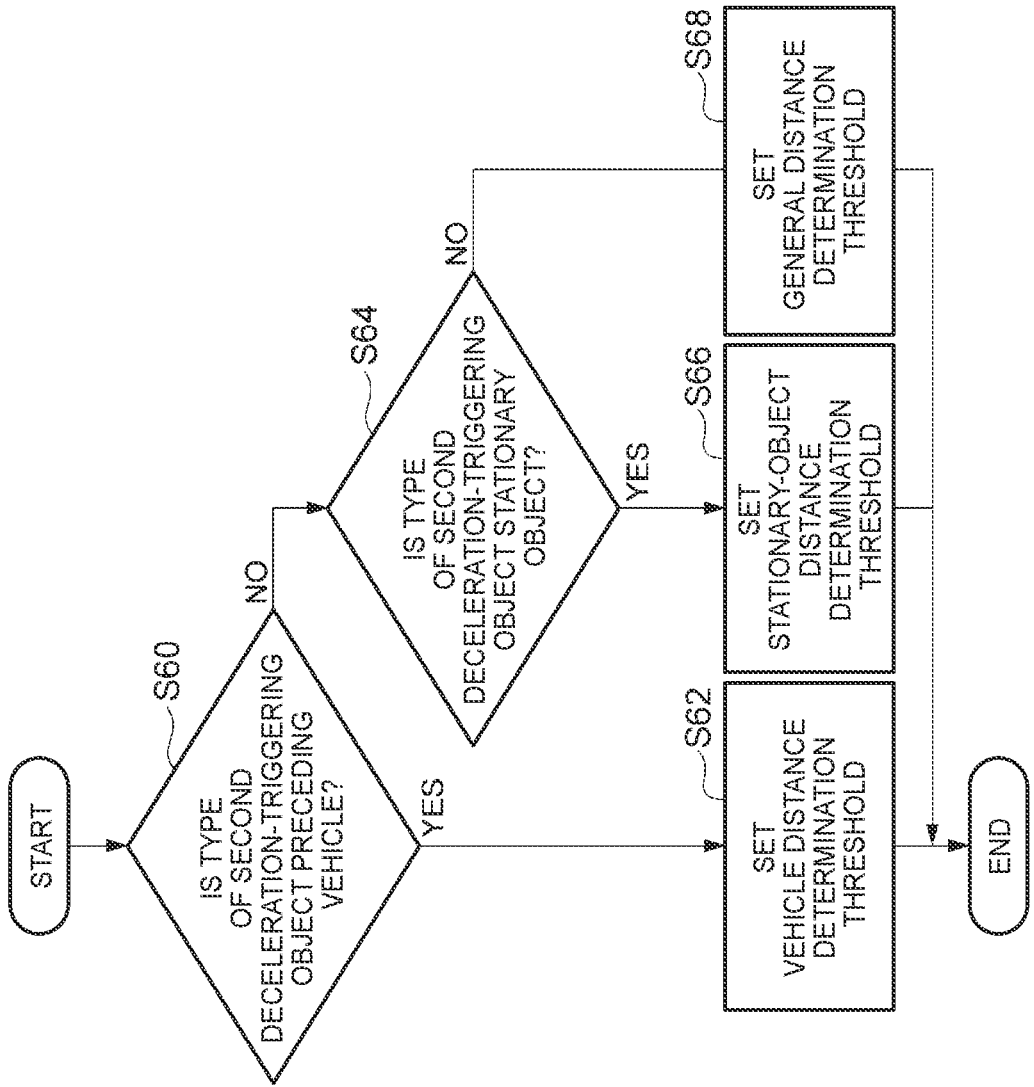
FIG. 6A is a flowchart illustrating an example of a distance determination threshold setting process.

FIG. 6B is a flowchart illustrating an example of a quick resumption condition determination process using a remaining traveling distance. As illustrated in FIG. 6B, the driving assistance ECU 10 causes, in S70, the quick resumption condition determination unit 17 to determine whether a traveling distance remaining until the deceleration assistance start condition for the second deceleration-triggering object is satisfied (assistance-resumption remaining traveling distance) is shorter than the distance determination threshold (distance determination threshold set through the distance determination threshold setting process).

When determination is made that the assistance-resumption remaining traveling distance is shorter than the distance determination threshold (S70: YES), the driving assistance ECU 10 proceeds to S72. When determination is not made that the assistance-resumption remaining traveling distance is shorter than the distance determination threshold (S70: NO), the driving assistance ECU 10 terminates the current process.

In S72, the driving assistance ECU 10 causes the quick resumption condition determination unit 17 to determine that the quick resumption condition is satisfied.

FIG. 7 is a flowchart illustrating another example of the quick resumption condition determination process. The quick resumption condition determination process illustrated in FIG. 7 can be employed when the type of the first deceleration-triggering object is a stop line or a traffic signal and when the type of the second deceleration-triggering object is a preceding vehicle.

As illustrated in FIG. 7, the driving assistance ECU 10 causes, in S80, the quick resumption condition determination unit 17 to determine whether the preceding vehicle being the second deceleration-triggering object is located behind the stop line being the first deceleration-triggering object or behind a stop line associated with the traffic signal being the first deceleration-triggering object. When the preceding vehicle is decelerating, an estimated stop position of the preceding vehicle is used. When determination is made that the preceding vehicle is located behind the stop line (S80: YES), the driving assistance ECU 10 proceeds to S82. When determination is not made that the preceding vehicle is located behind the stop line (S80: NO), the driving assistance ECU 10 terminates the current process.

In S82, the driving assistance ECU 10 causes the quick resumption condition determination unit 17 to determine that the quick resumption condition is satisfied.

The driving assistance apparatus 100 according to the first embodiment does not issue the deceleration assistance termination notification when the quick resumption condition determination unit determines that the quick resumption condition is satisfied, even in the case where the termination condition determination unit determines that the deceleration assistance termination condition for the first deceleration-triggering object is satisfied. Therefore, the driving assistance apparatus 100 can avoid issuing the deceleration assistance termination notification in a situation in which the termination of the deceleration assistance against the first deceleration-triggering object is followed by the start of the deceleration assistance against the second deceleration-triggering object in a short time. Thus, driver's discomfort due to the deceleration assistance termination notification can be suppressed as compared to a case where the deceleration assistance termination notification is issued without considering the start of the deceleration assistance against the second deceleration-triggering object.

According to the driving assistance apparatus 100, the driver may feel discomfort about the deceleration assistance termination notification at different timings depending on the type of the second deceleration-triggering object (for example, a preceding vehicle or a stop line). Therefore, the quick resumption condition is provided depending on the type of the second deceleration-triggering object. Thus, the driver's discomfort due to the deceleration assistance termination notification can be suppressed more appropriately.

The driving assistance apparatus 100 determines that the quick resumption condition is satisfied when a time remaining until the deceleration assistance start condition for the second deceleration-triggering object is satisfied is shorter than the time determination threshold. Therefore, the driving assistance apparatus 100 can avoid issuing the deceleration assistance termination notification when the deceleration assistance is resumed in a short time (time shorter than the time determination threshold) after the termination of the deceleration assistance against the first deceleration-triggering object. Thus, the driver's discomfort due to the deceleration assistance termination notification can be suppressed. According to the driving assistance apparatus 100, when the second deceleration-triggering object is a preceding vehicle that the driver is easily aware of, the driver can predict the next deceleration assistance against the preceding vehicle even if the deceleration assistance termination notification is issued. Therefore, the vehicle time determination threshold is set smaller than the stationary-object time determination threshold. Thus, when there is some time remaining until the deceleration assistance is resumed, the driver can be informed of temporary termination of the deceleration assistance (deceleration assistance against the first deceleration-triggering object) while suppressing driver's excessive discomfort.

The driving assistance apparatus 100 determines that the quick resumption condition is satisfied when a traveling distance remaining until the deceleration assistance start condition for the second deceleration-triggering object is satisfied is shorter than the distance determination threshold. Therefore, the driving assistance apparatus 100 can avoid issuing the deceleration assistance termination notification when the deceleration assistance is resumed in a short time (time during which the vehicle travels a distance shorter than the distance determination threshold) after the termination of the deceleration assistance against the first deceleration-triggering object. Thus, the driver's discomfort due to the deceleration assistance termination notification can be suppressed. Further, the driving assistance apparatus determines that the quick resumption condition is satisfied when the type of the second deceleration-triggering object is a stationary object and when the traveling distance remaining until the deceleration assistance start condition for the second deceleration-triggering object is satisfied is shorter than the stationary-object distance determination threshold that is larger than the vehicle distance determination threshold. The driving assistance apparatus reduces the issuance of the deceleration assistance termination notification when the second deceleration-triggering object is a stationary object and the driver is easily aware of the stationary object and easily predicts the next deceleration assistance against the stationary object. Thus, the driver's discomfort due to the deceleration assistance termination notification can be suppressed more appropriately.

Although the embodiment of the present disclosure is described above, the present disclosure is not limited to the embodiment described above. The present disclosure may be implemented not only in the embodiment described above but also in various embodiments to which various changes and modifications are made based on knowledge of persons having ordinary skill in the art.

The driving assistance apparatus 100 need not essentially recognize the types of the first deceleration-triggering object and the second deceleration-triggering object. Further, the deceleration assistance start condition, the deceleration assistance termination condition, and the quick resumption condition may be fixed conditions instead of the conditions that vary depending on the types.

The quick resumption condition determination unit 17 may use, for example, a pedestrian time determination threshold or a bicycle time determination threshold in place of the general time determination threshold. Further, the quick resumption condition determination unit 17 need not change the threshold depending on the type. The quick resumption condition determination unit 17 may make the determination on the quick resumption condition by using a fixed time determination threshold or a fixed distance determination threshold irrespective of the type.

What is claimed is:

1. A driving assistance apparatus configured to start deceleration assistance for a driver's vehicle based on a distance between the driver's vehicle and a deceleration-triggering object ahead of the driver's vehicle, the driving assistance apparatus comprising:
    a start condition determination unit configured to determine whether a preset deceleration assistance start condition is satisfied based on a distance between the driver's vehicle and a first deceleration-triggering object ahead of the driver's vehicle;
    a driving assistance unit configured to start the deceleration assistance for the driver's vehicle against the first deceleration-triggering object when the start condition determination unit determines that the deceleration assistance start condition is satisfied;
    a termination condition determination unit configured to determine whether a preset deceleration assistance termination condition is satisfied based on the distance between the driver's vehicle and the first deceleration-triggering object, or based on a speed of the driver's vehicle during the deceleration assistance for the driver's vehicle against the first deceleration-triggering object;
    a notification unit configured to issue a deceleration assistance termination notification to a driver of the driver's vehicle when the termination condition determination unit determines that the deceleration assistance termination condition is satisfied;
    a second deceleration-triggering object detection unit configured to determine whether a second deceleration-triggering object is detected ahead of the driver's vehicle during the deceleration assistance for the driver's vehicle against the first deceleration-triggering object; and
    a quick resumption condition determination unit configured to determine, when the termination condition determination unit determines that the deceleration assistance termination condition for the first deceleration-triggering object is satisfied and the second deceleration-triggering object detection unit determines that the second deceleration-triggering object is detected, whether a preset quick resumption condition is satisfied based on a distance between the driver's vehicle and the second deceleration-triggering object, and based on a relative speed between the driver's vehicle and the second deceleration-triggering object, wherein
    the notification unit is configured not to issue the deceleration assistance termination notification when the quick resumption condition determination unit determines that the quick resumption condition is satisfied, even in a case where the termination condition determination unit determines that the deceleration assistance termination condition for the first deceleration-triggering object is satisfied.

2. The driving assistance apparatus according to claim 1, wherein the quick resumption condition determination unit is configured to:
    estimate a remaining time until the deceleration assistance start condition for the second deceleration-triggering object is satisfied based on the distance between the driver's vehicle and the second deceleration-triggering object, and based on the relative speed between the driver's vehicle and the second deceleration-triggering object; and
    determine that the quick resumption condition is satisfied when the remaining time is shorter than a preset time determination threshold.

3. The driving assistance apparatus according to claim 1, wherein the quick resumption condition determination unit is configured to:
    estimate a remaining traveling distance until the deceleration assistance start condition for the second deceleration-triggering object is satisfied based on the distance between the driver's vehicle and the second deceleration-triggering object, and based on the relative speed between the driver's vehicle and the second deceleration-triggering object; and
    determine that the quick resumption condition is satisfied when the remaining traveling distance is shorter than a preset distance determination threshold.

4. The driving assistance apparatus according to claim 1, wherein:

the second deceleration-triggering object detection unit is configured to recognize a type of the detected second deceleration-triggering object; and the quick resumption condition determination unit is configured to use, as the quick resumption condition, a different condition dependent on the type of the second deceleration-triggering object.

5. The driving assistance apparatus according to claim 1, wherein:

the second deceleration-triggering object detection unit is configured to recognize a type of the detected second deceleration-triggering object;

the quick resumption condition determination unit is configured to estimate a remaining time until the deceleration assistance start condition for the second deceleration-triggering object is satisfied based on the distance between the driver's vehicle and the second deceleration-triggering object, and based on the relative speed between the driver's vehicle and the second deceleration-triggering object, determine that the quick resumption condition is satisfied when the type of the second deceleration-triggering object is a preceding vehicle and the remaining time is shorter than a preset vehicle time determination threshold, and determine that the quick resumption condition is satisfied when the type of the second deceleration-triggering object is a stationary object and the remaining time is shorter than a preset stationary-object time determination threshold; and the vehicle time determination threshold is smaller than a time determination threshold for the stationary object.

6. The driving assistance apparatus according to claim 1, wherein:

the second deceleration-triggering object detection unit is configured to recognize a type of the detected second deceleration-triggering object;

the quick resumption condition determination unit is configured to estimate a remaining traveling distance until the deceleration assistance start condition for the second deceleration-triggering object is satisfied based on the distance between the driver's vehicle and the second deceleration-triggering object, and based on the relative speed between the driver's vehicle and the second deceleration-triggering object, determine that the quick resumption condition is satisfied when the type of the second deceleration-triggering object is a preceding vehicle and the remaining traveling distance is shorter than a preset vehicle distance determination threshold, and determine that the quick resumption condition is satisfied when the type of the second deceleration-triggering object is a stationary object and the remaining traveling distance is shorter than a preset stationary-object distance determination threshold; and the vehicle distance determination threshold is smaller than the stationary-object distance determination threshold.

7. A driving assistance apparatus configured to start deceleration assistance for a driver's vehicle based on a distance between the driver's vehicle and a deceleration-triggering object ahead of the driver's vehicle, the driving assistance apparatus comprising:

a start condition determination unit configured to determine whether a preset deceleration assistance start condition is satisfied based on a distance between the driver's vehicle and a first deceleration-triggering object, the first deceleration-triggering object being a traffic signal or a stop line ahead of the driver's vehicle;

a driving assistance unit configured to start the deceleration assistance for the driver's vehicle against the first deceleration-triggering object when the start condition determination unit determines that the deceleration assistance start condition is satisfied;

a termination condition determination unit configured to determine whether a preset deceleration assistance termination condition is satisfied based on a vehicle speed of the driver's vehicle during the deceleration assistance for the driver's vehicle against the first deceleration-triggering object;

a notification unit configured to issue a deceleration assistance termination notification to a driver of the driver's vehicle when the termination condition determination unit determines that the deceleration assistance termination condition is satisfied;

a second deceleration-triggering object detection unit configured to determine whether a second deceleration-triggering object is detected during the deceleration assistance for the driver's vehicle against the first deceleration-triggering object, the second deceleration-triggering object being a preceding vehicle traveling ahead of the driver's vehicle; and a quick resumption condition determination unit configured to determine whether a preset quick resumption condition is satisfied when the termination condition determination unit determines that the deceleration assistance termination condition for the first deceleration-triggering object is satisfied and the second deceleration-triggering object detection unit determines that the second deceleration-triggering object is detected, wherein the quick resumption condition determination unit is configured to determine that the quick resumption condition is satisfied when the second deceleration-triggering object is located behind the stop line being the first deceleration-triggering object or behind a stop line associated with the traffic signal being the first deceleration-triggering object, and the notification unit is configured not to issue the deceleration assistance termination notification when the quick resumption condition determination unit determines that the quick resumption condition is satisfied, even in a case where the termination condition determination unit determines that the deceleration assistance termination condition for the first deceleration-triggering object is satisfied.

8. A driving assistance apparatus configured to start deceleration assistance for a driver's vehicle based on a distance between the driver's vehicle and a deceleration-triggering object ahead of the driver's vehicle, the driving assistance apparatus comprising a controller configured to:

determine whether a preset deceleration assistance start condition is satisfied based on a distance between the driver's vehicle, and based on a first deceleration-triggering object ahead of the driver's vehicle;

start the deceleration assistance for the driver's vehicle against the first deceleration-triggering object when determining that the deceleration assistance start condition is satisfied;

determine whether a preset deceleration assistance termination condition is satisfied based on the distance between the driver's vehicle and the first deceleration-triggering object, or based on a speed of the driver's vehicle during the deceleration assistance for the driver's vehicle against the first deceleration-triggering object;

issue a deceleration assistance termination notification to a driver of the driver's vehicle when determining that the deceleration assistance termination condition is satisfied;

determine whether a second deceleration-triggering object is detected ahead of the driver's vehicle during the deceleration assistance for the driver's vehicle against the first deceleration-triggering object; and determine, when determining that the deceleration assistance termination condition for the first deceleration-triggering object is satisfied and determining that the second deceleration-triggering object is detected, whether a preset quick resumption condition is satisfied based on a distance between the driver's vehicle and the second deceleration-triggering object, and based on a relative speed between the driver's vehicle and the second deceleration-triggering object, wherein the controller is configured not to issue the deceleration assistance termination notification when the controller determines that the quick resumption condition is satisfied, even in a case where the controller determines that the deceleration assistance termination condition for the first deceleration-triggering object is satisfied.

* * * * *